US00RE45122E

(19) United States
(12) Reissued Patent
Zervoglos et al.

(10) Patent Number: US RE45,122 E
(45) Date of Reissued Patent: Sep. 9, 2014

(54) NON-CONTACT PASSIVE RANGING SYSTEM

(71) Applicants: Nicholas Zervoglos, Acton, MA (US); Paul DeBitetto, Stow, MA (US); Scott Rasmussen, Andover, MA (US)

(72) Inventors: Nicholas Zervoglos, Acton, MA (US); Paul DeBitetto, Stow, MA (US); Scott Rasmussen, Andover, MA (US)

(73) Assignee: The Charles Stark Draper Laboratory, Inc., Cambridge, MA (US)

(21) Appl. No.: 13/987,621

(22) Filed: Aug. 15, 2013

Related U.S. Patent Documents

Reissue of:
(64) Patent No.: 8,194,928
Issued: Jun. 5, 2012
Appl. No.: 11/998,952
Filed: Dec. 3, 2007

(51) Int. Cl.
*G06K 9/00* (2006.01)

(52) U.S. Cl.
USPC ..... 382/106; 382/103; 382/107; 382/153; 382/154

(58) Field of Classification Search
None
See application file for complete search history.

(56) References Cited

U.S. PATENT DOCUMENTS

| | | | | |
|---|---|---|---|---|
| 5,272,351 | A * | 12/1993 | Andressen | 250/559.09 |
| 6,614,509 | B2 * | 9/2003 | Nonaka et al. | 356/3.14 |
| 6,995,748 | B2 | 2/2006 | Gordon et al. | |
| 2003/0189166 | A1 * | 10/2003 | Black et al. | 250/221 |
| 2007/0032318 | A1 * | 2/2007 | Nishimura et al. | 473/570 |

OTHER PUBLICATIONS

Barnard et al., "Computational Stereo", Computing Surveys, vol. 14, No. 4, 1982, pp. 553-572.*
S. Mehta et al., "Normal Optical Flow Camera", IEEE Letters, vol. 41, No. 13, p. 732-733 (Jun. 2005).
*Centeye, Products and Services* (visited Mar. 13, 2008), http://www.centeye.com/pages/products/products.html.

* cited by examiner

*Primary Examiner* — Thomas Conway
(74) *Attorney, Agent, or Firm* — Iandiorio Teska & Coleman, LLP

(57) ABSTRACT

A non-contact passive ranging system wherein a first imager on a platform is focused on a first object and a second imager on the platform is also focused on the first object. The optical path from the first object to the first imager is configured to be shorter than the optical path from the object to the second imager. Processing circuitry is responsive to an output of the first imager and an output of the second imager as relative motion is provided between the platform and the first object and is configured to calculate the distance from the platform to the object.

17 Claims, 5 Drawing Sheets

NON-CONTACT PASSIVE RANGING SYSTEM

Matter enclosed in heavy brackets [ ] appears in the original patent but forms no part of this reissue specification; matter printed in italics indicates the additions made by reissue.

FIELD OF THE INVENTION

This subject invention relates to distance measuring systems.

BACKGROUND OF THE INVENTION

Numerous distance measuring systems are known in the art and, by extension, so are systems which are able to resolve the motion of an object. Systems such as sonar, lidar, radar, and the like involve active emission of energy from a sensor to the object and thus such systems are often complex, expensive, and power intensive. The processing requirements underlying such systems are also typically intensive. Also, many prior systems may be fairly slow to acquire range information.

In fields such as robotics and portable navigation systems, fast, inexpensive, and low power ranging systems are desired.

SUMMARY OF THE INVENTION

It is therefore an object of this invention to provide a non-contact ranging system which is passive.

It is a further object of this invention to provide such a ranging system which does not involve intensive processing requirements.

It is a further object of this invention to provide such a ranging system which quickly acquires range information.

It is a further object of this invention to provide such a ranging system which is inexpensive.

It is a further object of this invention to provide such a ranging system which is low power in operation.

It is a further object of this invention to provide such a ranging system which is readily configurable to operate in different environments, for example in robotics, in vehicle based systems, and in portable navigation systems such as helmet or head mounted systems.

It is a further object of this invention to provide such a ranging system which is readily extensible to provide complete motion data.

The subject invention results at least in part from the realization that a viable non-contact passive ranging system, in one example, employs optical motion sensors configured so one is further away from an object than the other in which case the object will, to the sensors, appear to move at two different rates. Since the position of the two sensors is known, their outputs enable a processor to readily calculate the distance to the object. By extension, additional pairs of motion sensors allow the processor to fully calculate the motion of any platform the sensors are attached to.

The subject invention, however, in other embodiments, need not achieve all these objectives and the claims hereof should not be limited to structures or methods capable of achieving these objectives.

This subject invention features a non-contact passive ranging system. Typically, a first imager on a platform is focused on a first object and a second imager on the platform is also focused on the first object. The optical path from the first object to the first imager is designed to be shorter than the optical path from the object to the second imager. Processing circuitry is responsive to the output of the first imager and the output of the second imager as relative motion is provided between the platform and the first object and is configured to calculate the distance from the platform to the object.

In one embodiment, each imager is an optical motion sensor each outputting a velocity. The platform may be mobile. Also, there may be a beam splitter in the optical path of both the first and second imagers.

In another embodiment, there is a third imager and a fourth imager on the platform both focused on a second object. The optical path from the second object to the third imager is shorter than the optical path from the second object to the fourth imager. Now the processing circuitry is also responsive to an output of the third imager and an output of the fourth imager as relative motion is provided between the platform and the second object and is configured to calculate the distance from the platform to the second object. The processing circuitry may be further configured to calculate the linear velocity of the platform, and also the angular velocity of the platform.

In another embodiment, there is a fifth imager and a sixth imager both focused on a third object and the optical path from the third object to the fifth imager is shorter than the optical path from the third object to the sixth imager. Now the processing circuitry is also responsive to an output of the fifth imager and an output of the sixth imager as relative motion is provided between the platform and the third object and is configured to calculate the distance from the platform to the third object. The processing circuitry can be further configured to calculate the velocity of the platform in more than one direction and the angular velocity of the platform about more than one axis. Typically, the optical axes of the fifth and sixth imagers are orthogonal to the optical axes of the third and fourth imagers which are orthogonal to the optical axes of the first and second imagers.

The subject invention also features a method of determining the distance between a platform and an object. The method typically includes focusing a first imager on the platform at the object, focusing a second imager on the platform at the same object, and arranging the optical path from the first object to the first imager to be shorter than the optical path from the object to the second imager. Relative motion is provided between the platform and the object and the distance from the platform to the object is calculated based on reference and sample frames imaged by the first and second imagers. Providing relative motion may include moving the platform. Typically, the first imager outputs a first velocity $x_A$ of the platform and the second imager outputs second velocity $x_B$ of the platform. Calculating the distance h is a function of $x_A$, $x_B$ and the position of the first and second imagers on the platform.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
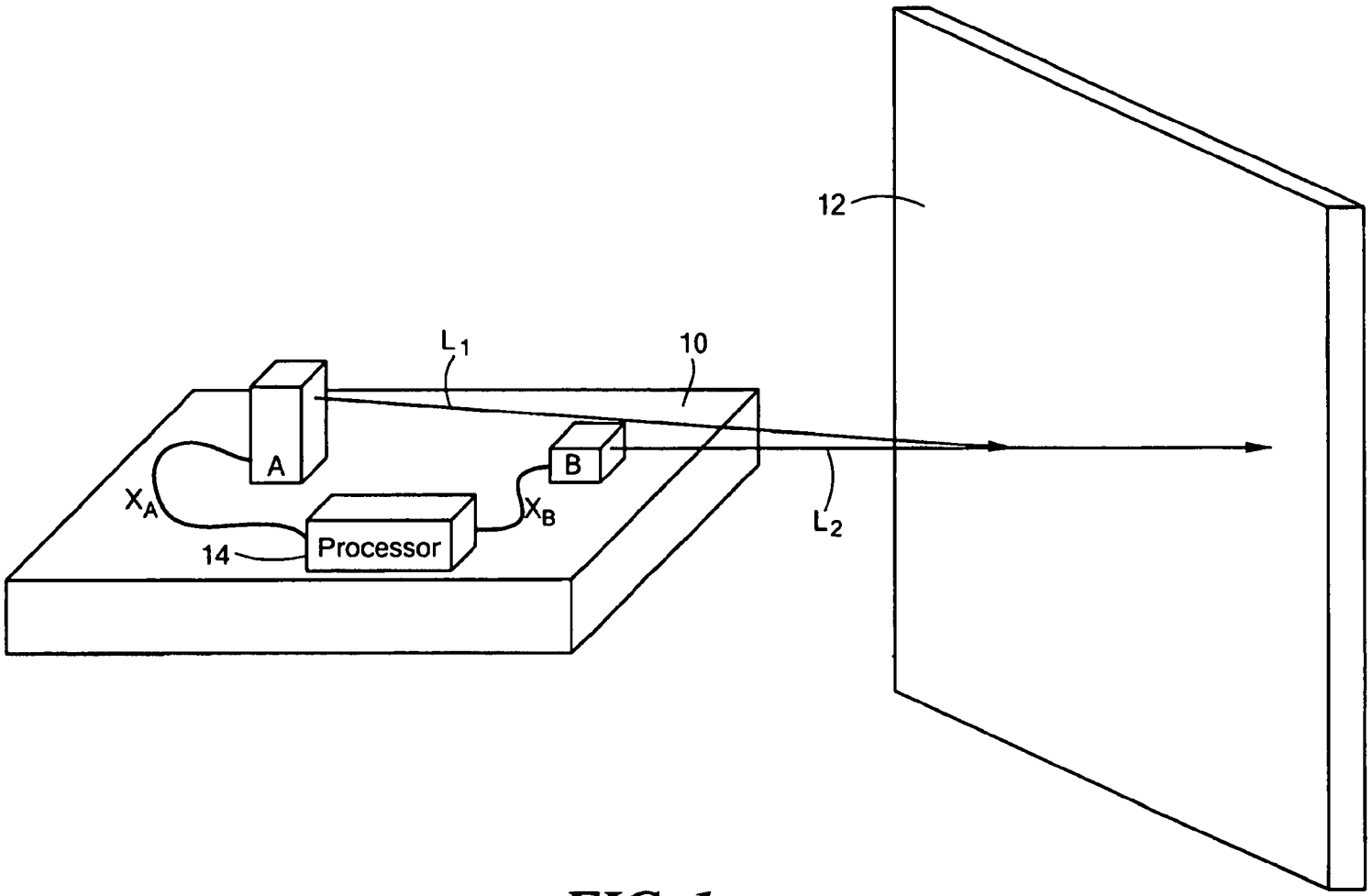
FIG. 1 is a highly schematic view showing an example of a non-contact passive ranging system in accordance with the subject invention.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

FIG. 1 schematically depicts an example of a non-contact passive ranging system in accordance with the subject invention. A passive imager B is mounted on platform 10 (a robot or a piece of machinery, for example) and is focused on object 12 (a wall, for example). Imager A is also located on platform 10 and focused on object 12. Sensors A and B are configured so the optical path from sensor B to object 12 is shorter than the optical path from object 12 to sensor A. Typically, sensors A and B are mounted on platform 10 so they are both focused on the same image on a plane. Sensor A is offset along the optical axis of the lens system so the optical distance of its image is longer than the optical distance of sensor B. Typically this is achieved by using beam splitter 20, FIG. 2 in the optical path to provide the same image to both sensors. The output of each sensor is a delta change that relates to how the latest image taken by each sensor can be shifted in order to best match a prior image taken by the sensor. These four output quantities are combined within processing unit 14, FIG. 1 programmed to determine the distance to object 12 using equations relating to the geometry of the arrangement of the sensors.

Figure 2:
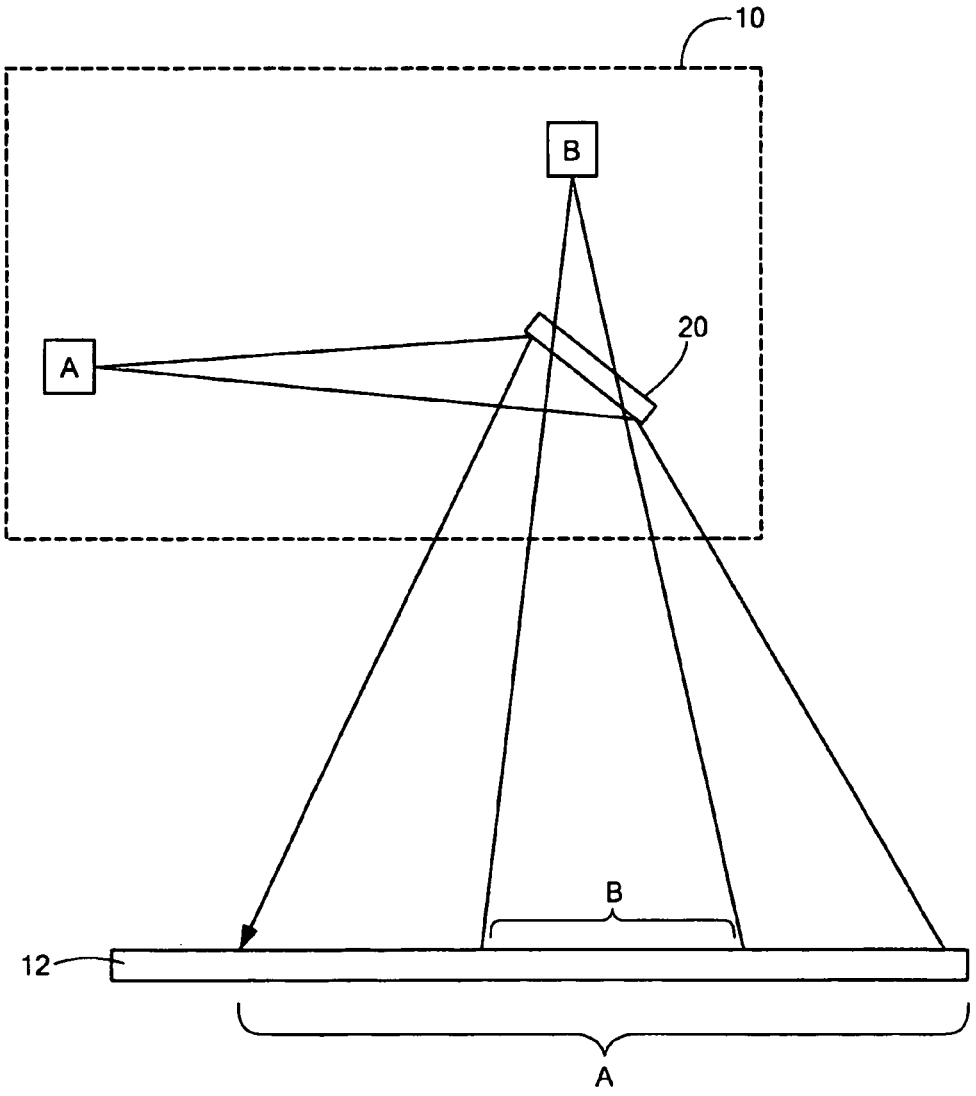
FIG. 2 is a schematic top view showing a beam splitter in the optical path between an object and two imagers in accordance with the subject invention.

In one example, sensors A and B are preferably optical motion sensors commonly used in optical computer mice. See U.S. Pat. No. 6,995,748 incorporated herein by this reference. Further away imager A captures a reference frame of object 12 at time $t_1$ and then a sample frame of object 12 at time $t_2$ as relative motion is provided between platform 10 and object 12. Similarly, closer imager B captures a reference frame of object 12 at time $t_1$ and then a sample frame of object 12 at time $t_2$. As shown in FIG. 2, assuming both imagers have the same field of view and each image captured by the closer imager (B) is at least partially subsumed by the image captured by the further away imager (A), the closer imager (B) will output a velocity of platform 10 that is less than the velocity of platform 10 output by the further away imager (A). This is because an object moving at a constant velocity will appear to an observer to be moving slower as the distance between the observer and the object increases.

Processor 14, FIG. 1 (a microprocessor, application specific integrated circuit, or other equivalent circuitry), is responsive to output $X_A$ of imager A and the output $X_B$ of imager B and is programmed to calculate the distance to object 12 as a function of these outputs and the known relative positions of the imagers. Exemplary electronic circuitry for controlling imagers A and B and for deriving velocity data is explained in U.S. Pat. No. 6,995,748 referenced above.

Figure 3:
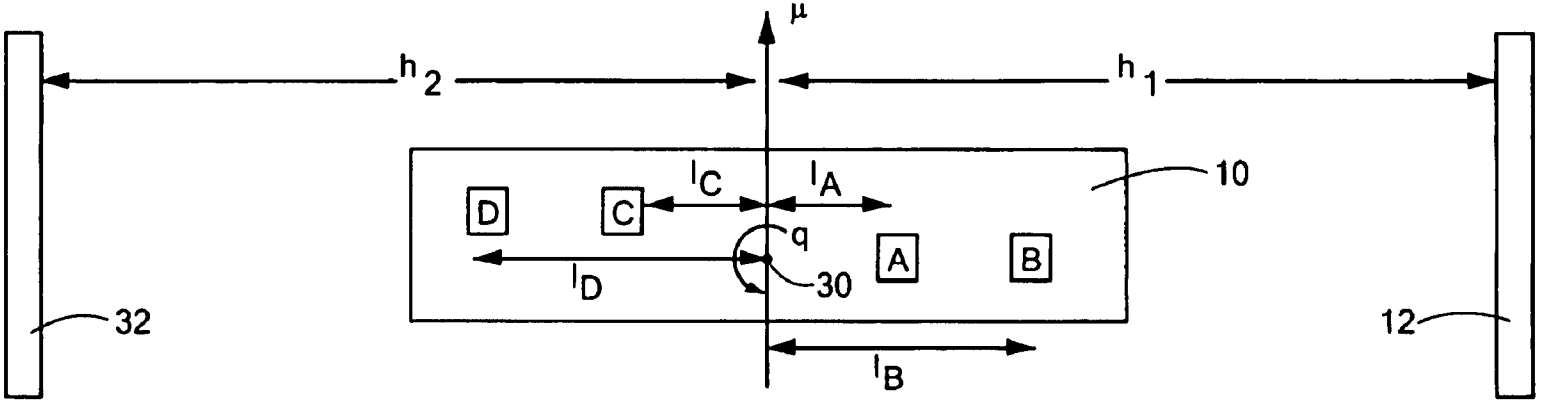
FIG. 3 is a schematic top view showing another embodiment of a non-contact passive ranging system in accordance with the subject invention which is capable of resolving additional motion data.

As shown in FIG. 3, platform 10 has reference location 30 depicted to be moving at velocity μ. Thus platform 10 is mobile and object 12 is stationary in this particular example. Imagers A and B on platform 10 have different length optical paths to object 12 as discussed above. $l_A$ is the distance from imager A to reference location 30 and $l_B$ is the distance from imager B to reference location 30. $h_1$, the distance from reference location 30 to object 12 is unknown but equals:

$$h_1 = \frac{X_A l_A - X_B l_B}{X_A - X_B} \tag{1}$$

where $X_A$ and $X_B$ are the velocity outputs of imagers A and B, respectively, when reference location 30 is moving with linear velocity μ relative to object 12.

By the addition of imagers C and D both imaging object 32 in a manner similar to the way imagers A and B image object 12, the distance $h_2$ from reference location 30 to object 32 and also the full motion of platform 10 can be resolved by processing circuitry (14, FIG. 1) as follows. q is the rotation movement of platform 10 about an axis through reference location 30. $X_A$, $X_B$, $X_C$, and $X_D$ are the velocity outputs of imagers A, B, C, and D, respectively, as platform 10 moves in the direction shown at velocity μ thus:

$$X_A = q + \frac{\mu + l_A q}{h_1 - l_A}, \tag{2}$$

$$X_B = q + \left(\frac{\mu + l_B q}{h_1 - l_B}\right), \tag{3}$$

$$X_C = q + \frac{(-\mu + l_C q)}{h_2 - l_C}, \text{ and} \tag{4}$$

$$X_D = q + \frac{-\mu + l_D q}{h_2 - l_D}. \tag{5}$$

$h_1$ is then:

$$h_1 = \frac{X_A l_A - X_B l_B}{X_A - X_B}. \tag{6}$$

$h_2$ is:

$$h_2 = \frac{X_C l_C - X_D l_D}{X_C - X_D} \tag{7}$$

q can now be solved:

$$q = \frac{X_D(h_2 - l_D) + X_B(h_1 - l_B)}{(h_2 + h_1)}, \text{ or} \tag{8}$$

$$q = \frac{X_C(h_2 - l_C) + X_B(h_1 - l_B)}{(h_2 + h_1)}. \tag{9}$$

μ is:

-continued $$\mu = \frac{X_D(h_1 l_D - h_2 h_1) + X_B(h_2 h_1 - h_2 l_B)}{(h_2 + h_1)}, \text{ or} \tag{10}$$

$$\mu = \frac{X_A(h_1 h_2 - h_2 l_A) + X_C(h_1 l_C - h_1 h_2)}{(h_2 + h_1)} \tag{11}$$

By adding another pair of imagers focused on a third object (e.g., the floor beneath platform 10), additional motion data can be ascertained.

In accordance with the subject invention, no radiation other than ambient illumination or contact is required and the processing time is minimal with low latency and rapid update rates. The subject invention is not limited to optical sensing devices in the form of the optical motion sensors discussed above, however. The optical sensing devices could be cameras with separate processing units that calculate the frame to frame motion of a video sequence. In accordance with this configuration, it is possible to not only derive a single distance, but to also create a range map which provides readings to all points within the field of view of one of the imagers. In this configuration, it is also possible to derive the motion of the object on which the cameras are mounted.

When cameras are used instead of simple optical motion sensors, the solution of the depth map of the mutually overlapping portions of the two images is possible. With a sufficiently wide field of view and/or pairs of cameras aimed in different directions, it also becomes feasible to measure the full motion.

The combination of three pairs of such devices in which the optical axis of the three pairs are orthogonal to each other yields the ability to not only measure the three distances but also to derive the full motion of the object on which the sensors are mounted. In one example, an optimal combination of five optical navigation sensors arranged with three in a plane and subtending two orthogonal axes and two more vertically offset allow for the sensing of motion, height, and attitude relative to a reference plane. Such an arrangement might be mounted to a ground vehicle such as an automobile and used to measure the sway and tilt of the vehicle in addition to its turn rate and velocity relative to a plane. Two optical sensing devices could be separated vertically both pointing in the same direction but offset slightly horizontally. In this arrangement, there will be no optical apparatus to split the images and the two devices would be focused on different images but in certain situations this would still function adequately. The two optical sensing devices could be separated vertically and offset slightly horizontally but angled slightly towards each other as well. There could also be other optical apparatus to create the vertical separation between the two devices.

There are numerous other possible applications for the subject invention. Robotic applications include those requiring image and range mapping. 3-D model capture in situations involving relative motion between a sensor and an object being imaged are also applications. The subject invention can be used to sense motion of a moving vehicle or machine. Altitude sensing for small unmanned aircraft or rotorcraft is possible as is measurement of motion relative to a flat plane, for example crane operations, farm equipment navigation, and automobile navigation.

Figure 4:
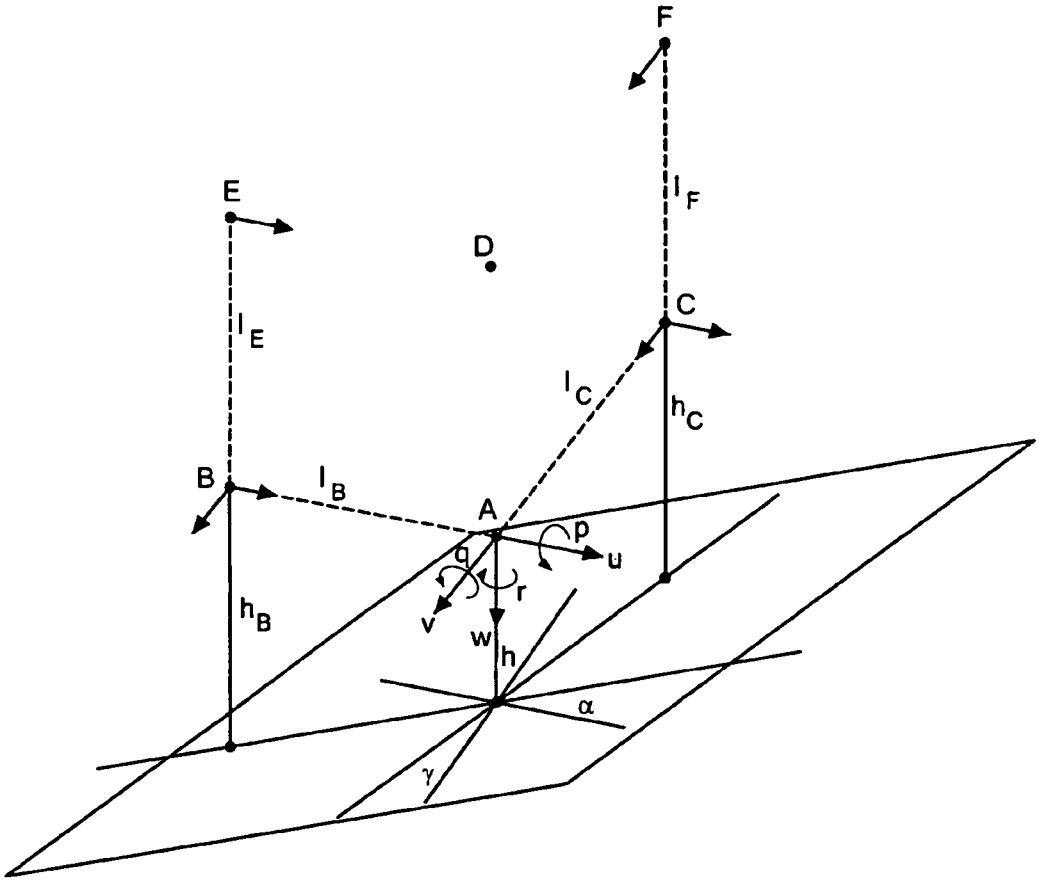
FIG. 4 is a schematic view showing a configuration of sensors for measuring motion relative to a plane using five sensors.

As shown in FIG. 4, the relative motion of a plane or arrangement of optical motion sensors and the plane imaging can be resolved. Small angles and fast sampling frequency are assumed in the optical sensors. All of the sensors are aligned so that the directions of their outputs are the same. The directions of their X outputs are the same and so are the direction of their Y outputs. Three sensors (A, B, and C) in a plane are preferably arranged such that the vector from A to B is orthogonal to the vector from A to C. The distance between A and B is equal to the distance between A and C. Two more sensors are placed in a second plane parallel to the first plane so that the direction from sensor B to sensor E is perpendicular to the first plane and sensor F is similarly placed relative to sensor C. The plane being imaged is an unknown distance from sensor A and angled away from the plane defined by A, B, and C. Sensor A is linearly translating with an unknown velocity in the plane A, B, and C and simultaneously rotating at unknown rates around all three axes.

In one example, it can be assumed that $l_C = i_B = l$, and $l_F = l_E = l_h$, where $l_h$ is the distance from B to E or C to F, and l is the distance from A to B or A to C.

Other definitions are as follows:

$x_A$, $x_B$, $x_C$, $x_E$, $x_F$ are the X outputs of each optical sensor and $y_A$, $y_B$, $Y_C$, $y_E$, $y_F$ are the Y output of each optical sensor. $\alpha$ is the angle between the vector (B⇨ A) and the projection of that vector onto the image plane, $\gamma$ is the angle between the vector (C⇨ A) and the projection of that vector onto the image plane, h is the distance from A to the image plane measured perpendicularly to the plane (A, B, C), $h_B$ is the distance from B to the image plane measured perpendicularly to the plane (A, B, C), and $h_C$ is the distance from C to the image plane measured perpendicularly to the plane (A, B, C). u is the linear velocity of A in the direction (B⇨ A), v is the linear velocity of A in the direction (C⇨ A), p is the rotational velocity of A about the axis (B⇨ A), q is the rotational velocity of A about the axis (C⇨ A), and r is the rotational velocity of A about the axis (B⇨ A).

Thus, $$x_A = q + \frac{u}{h}, \tag{12}$$

$$x_B = q + \frac{u}{h + l_B \tan\alpha}, \tag{13}$$

$$x_C = q + \frac{u + l_C r}{h - l_C \tan\gamma}, \text{ and} \tag{14}$$

$$x_E = q + \frac{u - l_E q}{h + l_E + l_B \tan\alpha}. \tag{15}$$

$$y_A = -p + \frac{v}{h} \tag{16}$$

$$y_B = -p + \frac{v - l_B r}{h + l_B \tan\alpha}, \tag{17}$$

$$y_C = -p + \frac{v}{h - l_C \tan\gamma}, \text{ and} \tag{18}$$

$$y_F = -p + \frac{v + -l_F p}{h + l_F - l_C \tan\gamma}. \tag{19}$$

Then, $$h_C = \frac{x_F l_h}{x_C - x_F} = \frac{y_F l_h}{y_C - y_F}, \tag{20}$$

$$h_B = \frac{x_E l_h}{x_B - x_E} = \frac{y_E l_h}{y_B - y_E}, \tag{21}$$

-continued $$h_B(y_B - x_B) + \frac{h_C(x_C - y_C)}{(h_C - h_B)} = \frac{(hx_A - hx_A x_B)}{(h - h_B)} - \frac{(hy_A - h_C y_C)}{(h - h_C)}, \quad (22)$$

$$\tan(\alpha) = \frac{h_B - h}{l}, \quad (23)$$

$$\tan(\gamma) = \frac{-h_C + h}{l}, \quad (24)$$

$$p = \frac{-(hy_A - h_C y_C)}{(h - h_C)}, \quad (25)$$

$$q = \frac{(hx_A - h_B x_B)}{(h - h_B)}, \quad (26)$$

$$u = h_B(x_B - q), \quad (27)$$

$$v = h_C(y_C + p), \text{ and} \quad (28)$$

$$r = \frac{v - h_B(y_B + p)}{l} = \frac{h_C(x_C - q) - u}{l}. \quad (29)$$

Figure 5:
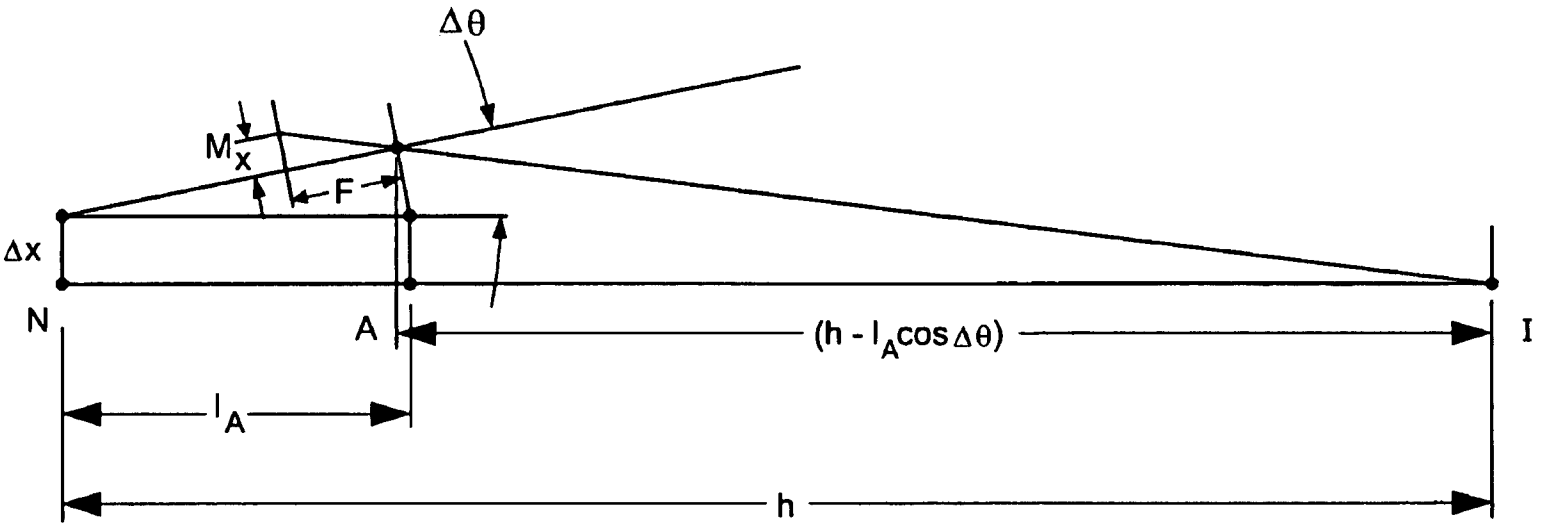
FIG. 5 is a schematic view of a configuration where a sensor is used track a single point on an image.

FIG. 5 and the equations below demonstrate the output of a single optical sensor (A) tracking a single point on an image (I) when motion is applied to the sensor in both a linear and rotational sense at a navigated point (N). This can be extended to apply to tracking multiple points using a single imager by applying an angular offset of the image plane equal to the angular location of the image point relative to the center of the initial image.

$m_x$ is the distance on the focal plane that the image point has moved (output of the optical sensor system), f is the pin-hole equivalent focal length of the optical lens system employed, $l_A$ is the distance from the navigated point on the body in motion to the aperture of the optical system, Δx is the linear motion of the body in motion as measured at the navigated point, Δθ is the angular motion of the body in motion as measure at the navigated point, and h is the distance from the navigated point to the image point being tracked at the time of the initial image.

Then, $$\frac{m_x}{f} = \tan\left(\Delta\theta + \tan^{-1}\left(\frac{\Delta x + l_A \sin(\Delta\theta)}{h - l_A \cos(\Delta\theta)}\right)\right), \text{ and} \quad (30)$$

$$= \frac{\tan(\Delta\theta) + \left(\frac{\Delta x + l_A \sin(\Delta\theta)}{h - l_A \cos(\Delta\theta)}\right)}{1 - \left(\frac{\Delta x + l_A \sin(\Delta\theta)}{h - l_A \cos(\Delta\theta)}\right)\tan(\Delta\theta)}. \quad (31)$$

Then, assuming small angles, (i.e. tan θ=θ), $$\frac{m_x}{f} \approx \Delta\theta + \left(\frac{\Delta x + l_A \Delta\theta}{h - l_A}\right) \text{ or,} \quad (32)$$

$$\approx \frac{\Delta\theta + \frac{\Delta x + l_A \Delta\theta}{h - l_A}}{1 - \left(\frac{\Delta x + l_A \Delta\theta}{h - l_A}\right)\Delta\theta}. \quad (33)$$

This implies that an assumption of small angles and small distances holds true for:

$$\left(\frac{\Delta x + l_a \Delta\theta}{h - l_A}\right)\Delta\theta << 1, \text{ or} \quad (34)$$

$$(\Delta x + l_A \Delta\theta)\Delta\theta << h - l_A \quad (35)$$

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

What is claimed is:

1. A non-contact passive ranging system comprising:

a first optical motion sensor on a platform focused on a first object;

a second optical motion sensor on the platform also focused on the first object;

the optical path from the first object to the first optical motion sensor shorter than the optical path from the first object to the second optical motion sensor; and processing circuitry responsive to an output of the first optical motion sensor and an output of the second optical motion sensor as relative motion is provided between the platform and the first object and configured to calculate the distance from the platform to the object based on a [slower velocity] *different velocity* output by the first optical motion sensor than the second optical motion sensor and based on the different optical path lengths of the first and second optical motion sensors.

2. The system of claim 1 in which the platform is mobile.

3. The system of claim 1 in which there is a beam splitter in the optical path of both the first and second optical motion sensors.

4. The system of claim 1 in which the distance between the first and second optical motion sensors is predetermined.

5. The system of claim 1 in which there is a third optical motion sensor and a fourth optical motion sensor on the platform both focused on a second object, the optical path from the second object to the third optical motion sensor shorter than the optical path from the second object to the fourth optical motion sensor.

6. The system of claim 5 in which the processing circuitry is responsive to an output of the third optical motion sensor and an output of the fourth optical motion sensor as relative motion is provided between the platform and the second object and configured to calculate the distance from the platform to the second object.

7. The system of claim 6 in which the processing circuitry is further configured to calculate the linear velocity of the platform.

8. The system of claim 7 in which the processing circuitry is further configured to calculate the angular velocity of the platform.

9. The system of claim 5 in which there is a fifth optical motion sensor and a sixth optical motion sensor both focused on a third object, the optical path from the third object to the fifth optical motion sensor shorter than the optical path from the third object to the sixth optical motion sensor.

10. The system of claim 9 in which the optical axes of the fifth and sixth are orthogonal to the optical axes of the third and fourth optical motion sensors which are orthogonal to the optical axes of the first and second optical motion sensors.

11. The system of claim 9 in which the processing circuitry is responsive to an output of the fifth optical motion sensor and an output of the sixth optical motion sensor as relative motion is provided between the platform and the third object and configured to calculate the distance from the platform to the third object.

12. The system of claim 11 in which the processing circuitry is further configured to calculate the velocity of the platform in more than one direction and the angular velocity of the platform about more than one axis.

13. A method of determining the distance between a platform and an object, the method comprising:

focusing a first optical motion sensor on the platform at the object;

focusing a second optical motion sensor on the platform at the same object;

arranging the optical path from the first object to the first optical motion sensor to be shorter than the optical path from the object to the second optical motion sensor;

providing relative motion between the platform and the object; and calculating the distance from the platform to the object based on a [slower velocity] *different velocity* output by the first optical motion sensor than the second optical motion sensor and based on the different optical path lengths of the first and second optical motion sensors.

14. The method of claim 13 in which the distance between the first and second optical motion sensors is predetermined.

15. The method of claim 13 in which providing relative motion includes moving the platform.

16. The method of claim 15 in which the first optical motion sensor outputs a first velocity $x_A$ of the platform and the second optical motion sensor outputs second velocity $x_B$ of the platform.

17. The method of claim 16 in which calculating the distance h is a function of $x_A$, $x_B$ and the position of the first and second optical motion sensors on the platform.

* * * * *